United States Patent
Truchan et al.

(10) Patent No.: US 11,323,488 B2
(45) Date of Patent: May 3, 2022

(54) ENHANCED LAWFUL INTERCEPTION

(71) Applicant: Telefonaktiebolaget LM Ericsson (publ), Stockholm (SE)

(72) Inventors: Catherine Truchan, Lorraine (CA); Suresh Krishnan, Suwanee, GA (US); Daniel Migault, Montreal (CA); Stere Preda, Longueuil (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 151 days.

(21) Appl. No.: 16/620,035

(22) PCT Filed: Jun. 7, 2017

(86) PCT No.: PCT/IB2017/053368
§ 371 (c)(1),
(2) Date: Dec. 6, 2019

(87) PCT Pub. No.: WO2018/224862
PCT Pub. Date: Dec. 13, 2018

(65) Prior Publication Data
US 2020/0213839 A1 Jul. 2, 2020

(51) Int. Cl.
*H04L 29/06* (2006.01)
*H04L 9/08* (2006.01)
(Continued)

(52) U.S. Cl.
CPC .......... *H04L 63/306* (2013.01); *H04L 9/0819* (2013.01); *H04L 9/0869* (2013.01);
(Continued)

(58) Field of Classification Search
None
See application file for complete search history.

(56) References Cited

U.S. PATENT DOCUMENTS

| 8,850,044 B2 | 9/2014 | Cohen et al. |
| 2011/0150211 A1 | 6/2011 | Anderson |

(Continued)

FOREIGN PATENT DOCUMENTS

| EP | 2053820 A1 | 4/2009 |
| WO | 2013117243 A1 | 8/2013 |
| WO | 2015113996 A2 | 8/2015 |

OTHER PUBLICATIONS

Author Unknown, "Technical Specification Group Services and System Aspects; 3G Security; Lawful interception requirements (Release 14)," Technical Specification 33.106, Version 14.0.0, 3GPP Organizational Partners, Mar. 2017, 22 pages.
(Continued)

*Primary Examiner* — Brandon S Hoffman
(74) *Attorney, Agent, or Firm* — Withrow & Terranova, PLLC (57) ABSTRACT

Systems and methods are disclosed herein that relate to secure monitoring or interception of traffic in a wireless communications system. In some embodiments, a method of operation of a network node comprises receiving a list of one or more obfuscated target identifiers from a monitoring node, where each obfuscated target identifier is a user identifier of a target user that is encrypted using a first encryption key that is unknown to the network node. The method further comprises receiving an encrypted packet from another network node and determining whether an encrypted user identifier of the encrypted packet matches one of the obfuscated target identifiers. The method further comprises, if the encrypted user identifier matches one of the obfuscated target identifiers, further encrypting the encrypted packet using a second encryption key negotiated between the network node and the monitoring node and
(Continued)

transmitting the further encrypted packet to the monitoring node.

11 Claims, 7 Drawing Sheets

(51) Int. Cl.
*H04W 12/033* (2021.01)
*H04W 12/037* (2021.01)
*H04W 12/80* (2021.01)

(52) U.S. Cl.
CPC ....... *H04W 12/033* (2021.01); *H04W 12/037* (2021.01); *H04W 12/80* (2021.01); *H04L 2209/80* (2013.01)

(56) References Cited

U.S. PATENT DOCUMENTS

| 2015/0220625 | A1* | 8/2015 | Cartmell | H04L 63/308 707/754 |
| 2017/0149740 | A1* | 5/2017 | Mansour | H04L 9/0822 |

OTHER PUBLICATIONS

Author Unknown, "Technical Specification Group Services and System Aspects; 3G Security; Lawful interception architecture and functions (Release 14)," Technical Specification 33.107, Version 14.0.0, 3GPP Organizational Partners, Dec. 2016, 320 pages.

Author Unknown, "Technical Specification Group Services and System Aspects; 3GPP System Architecture Evolution (SAE); Security architecture (Release 14)," Technical Specification 33.401, Version 14.2.0, 3GPP Organizational Partners, Mar. 2017, 152 pages.

Author Unknown, "Technical Specification Group Radio Access Network; Evolved Universal Terrestrial Radio Access (E-UTRA); Packet Data Convergence Protocol (PDCP) specification (Release 14)," Technical Specification 36.323, Version 14.2.0, 3GPP Organizational Partners, Mar. 2017, 43 pages.

Author Unknown, "Lawful Interception (LI); Security framework in Lawful Interception and Retained Data environment," Change Request (CR) to European Telecommunications Standards Institute (ETSI), Technical Report (TR) 102 661, Version 1.2.1, Nov. 2009, 48 pages.

Blaze, Matt, et al., "Divertible Protocols and Atomic Proxy Cryptography," Advances in Cryptology—EUROCRYPT'98, Lecture Notes in Computer Science, vol. 1403, Springer, Berlin, Heidelberg, 1998, pp. 127-144.

Boneh, Dan, et al., "Key Homomorphic PRFs and Their Applications," Cryptology ePrint Archive: Report 2015/220, URL: https://eprint.iacr.org/2015/220.pdf, Mar. 8, 2015, 41 pages.

KPN, "LI(13)R29011: Discussion on adding security mechanisms to TR 102 661 for protection of LI target identities," European Telecommunications Standards Institute (ETSI), LI-rapporteur's meeting—LI-RAP#29, Aug. 22, 2013, 2 pages.

Perkins, C., et al., "MN Identifier Types for RFC 4283 Mobile Node Identifier Option," draft-ietf-dmm-4283mnids-04.txt, RFC 4283bis, Distributed Mobility Management (dmm), Internet-Draft, Internet Engineering Task Force (IETF), Jan. 17, 2017, 14 pages.

Sherry, Justine, et al., "BlindBox: Deep Packet Inspection over Encrypted Traffic—Extended Technical Report," Cryptology ePrint Archive Report: 2015/264, URL: https://eprint.iacr.org/2015/264.pdf, Mar. 21, 2015, 22 pages.

International Search Report and Written Opinion for International Patent Application No. PCT/IB2017/053368, dated Mar. 1, 2018, 15 pages.

Examination Report for European Patent Application No. 17732582.6, dated Apr. 22, 2021, 5 pages.

* cited by examiner

ENHANCED LAWFUL INTERCEPTION

This application is a 35 U.S.C. § 371 national phase filing of International Application No. PCT/IB2017/053368, filed Jun. 7, 2017, the disclosure of which is incorporated herein by reference in its entirety.

TECHNICAL FIELD

The present disclosure relates to lawful interception of traffic in a wireless communication system.

BACKGROUND

There is a desire to continuously establish viable solutions to guarantee ubiquitous and permanently evolving connectivity among devices from all types of environments. Intrinsic values of these solutions are resource optimization and efficiency, extensibility and scalability, and cost efficiency. A design component of wireless communication network products and services that is a current trend is the security and privacy enforcement dimension added to answer a wide range of requirements from all types of stakeholders including Law Enforcement Agencies (LEAs). LEAs require Lawful Interception (LI) deployments for interception and processing of Control Plane (CP) and User Plane (UP) data of a specific User Equipment device (UE) designated as an LI target by the LEA.

The Third Generation Partnership Project (3GPP) standardizes the LI interface, functions, and requirements in 3GPP Technical Specification (TS) 33.107 and TS 33.106 (see, e.g., v14.0.0). For instance, requirements include access to the LI process by authorized personnel only. Specifically, 3GPP TS 33.106 states:

The intercept function shall only be accessible by authorised personnel. Only authorised personnel can be aware that an intercept function has been activated on a target. No indication shall be given to any person except authorised personnel that the intercept function has been activated on a target. To be effective, interception must take place without the knowledge of any party to the communication.

In 3GPP TS 33.107, there are several Intercept Related Information (IRI) and Communication of Content (CC) types of data to be sent to the LEA. For the particular case of a LI UE target, examples of IRI and CC include events such as UE attach and connect, tracking area update, but also Internet Protocol (IP) headers, or even IP payloads. All types of IRI and CC data are assumed to be supported by today's Evolved Packet System (EPS) standard interception systems.

As to LI deployments, it is believed that some operators prefer to simply duplicate traffic including the non-LI target related one for transfer to an LEA. The LEA has to filter this data to isolate the "LI interesting" traffic based on CP traces.

SUMMARY

Systems and methods are disclosed herein that relate to secure monitoring or interception of traffic in a wireless communications system. In some embodiments, a method of operation of a network node in a cellular communications network to provide monitoring of cellular network traffic comprises receiving a list of one or more obfuscated target identifiers from a monitoring node, where each obfuscated target identifier of the one or more obfuscated target identifiers is a user identifier of a target user that is encrypted using a first encryption key that is unknown to the network node. The method further comprises receiving an encrypted packet from an element that operates to intercept traffic on another network node in the cellular communications network. The encrypted packet is a concatenation of an encrypted user identifier, which is a user identifier encrypted using the first encryption key, and an encrypted data block, which is a block of data associated with the user identifier where the block of data is encrypted using the first encryption key. The method further comprises determining whether the encrypted user identifier of the encrypted packet matches one of the one or more obfuscated target identifiers. The method further comprises, if the encrypted user identifier of the encrypted packet matches one of the one or more obfuscated target identifiers, further encrypting the encrypted packet using a second encryption key negotiated between the network node and the monitoring node to thereby provide a further encrypted packet and transmitting the further encrypted packet to the monitoring node. In this manner, monitoring of traffic is provided without exposing the plaintext target identifier even within the cellular communications network.

In some embodiments, the block of data is an intercept related information or communication of content type of data. In some embodiments, the block of data comprises data related to an attach procedure performed for a wireless device having the associated user identifier, data related to a connection procedure performed for the wireless device having the associated user identifier, data related to a tracking area update performed for the wireless device having the associated user identifier, an Internet Protocol (IP) header for an IP packet to or from the wireless device having the associated user identifier, and/or an IP payload for the IP packet to or from the wireless device having the associated user identifier.

In some embodiments, the method further comprises receiving, from the element, a second encrypted packet and associated cryptographic information. The second encrypted packet is a concatenation of a second encrypted user identifier, which is a second user identifier encrypted using an updated version of the first encryption key, and a second encrypted data block, which is a block of data associated with the second user identifier where the block of data is encrypted using the updated version of the first encryption key. The method further comprises updating the one or more obfuscated target identifiers based on the associated cryptographic information to provide one or more updated obfuscated target identifiers and determining whether the second encrypted user identifier of the second encrypted packet matches one of the one or more updated obfuscated target identifiers. The method further comprises, if the second encrypted user identifier of the second encrypted packet matches one of the one or more updated obfuscated target identifiers, further encrypting the second encrypted packet using the second encryption key negotiated between the network node and the monitoring node to thereby provide a second further encrypted packet and transmitting the second further encrypted packet to the monitoring node. In some embodiments, transmitting the second further encrypted packet to the monitoring node comprises transmitting the second further encrypted packet and at least a portion of the cryptographic information to the monitoring node. In some embodiments, the at least a portion of the cryptographic information comprises an indication that enables the monitoring node to update the one or more obfuscated target identifiers. In some embodiments, the cryptographic information comprises information that enables updating the one or more obfuscated target identifiers without secret keys. In some embodiments, the cryptographic information comprises a delta value that represents a difference between the pseudorandom keystream that represents the first encryption key and a second pseudorandom keystream that represents the updated version of the first encryption key. In some embodiments, the cryptographic information further comprises a sequence number used to generate the updated version of the first encryption key. In some embodiments, the first encryption key is a pseudorandom keystream generated via Advanced Encryption Standard (AES) in counter mode.

Embodiments of a network node to provide monitoring of cellular network traffic are also disclosed. In some embodiments, a network node to provide monitoring of cellular network traffic is adapted to receiving a list of one or more obfuscated target identifiers from a monitoring node, where each obfuscated target identifier of the one or more obfuscated target identifiers being a user identifier of a target user that is encrypted using a first encryption key that is unknown to the network node. The network node is further adapted to receive an encrypted packet from an element that operates to intercept traffic on another network node in the cellular communications network. The encrypted packet is a concatenation of an encrypted user identifier, which is a user identifier encrypted using the first encryption key, and an encrypted data block, which is a block of data associated with the user identifier where the block of data is encrypted using the first encryption key. The network node is further adapted to determine whether the encrypted user identifier of the encrypted packet matches one of the one or more obfuscated target identifiers. The network node is further adapted to, if the encrypted user identifier of the encrypted packet matches one of the one or more obfuscated target identifiers, further encrypt the encrypted packet using a second encryption key negotiated between the network node and the monitoring node to thereby provide a further encrypted packet and transmit the further encrypted packet to the monitoring node. In this manner, monitoring of traffic is provided without exposing the plaintext target identifier even within the cellular communications network.

In some embodiments, a network node to provide monitoring of cellular network traffic comprises at least one processor and memory comprising instructions executable by the at least one processor whereby the network node is operable to: receive a list of one or more obfuscated target identifiers from a monitoring node, where each obfuscated target identifier of the one or more obfuscated target identifiers is a user identifier of a target user that is encrypted using a first encryption key that is unknown to the network node; receive an encrypted packet from an element that operates to intercept traffic on another network node in the cellular communications network, where the encrypted packet is a concatenation of an encrypted user identifier, which is a user identifier encrypted using the first encryption key, and an encrypted data block, which is a block of data associated with the user identifier where the block of data is encrypted using the first encryption key; determine whether the encrypted user identifier of the encrypted packet matches one of the one or more obfuscated target identifiers; and, if the encrypted user identifier of the encrypted packet matches one of the one or more obfuscated target identifiers, further encrypt the encrypted packet using a second encryption key negotiated between the network node and the monitoring node to thereby provide a further encrypted packet and transmit the further encrypted packet to the monitoring node. In this manner, monitoring of traffic is provided without exposing the plaintext target identifier even within the cellular communications network.

In some embodiments, a network node to provide monitoring of cellular network traffic comprises one or more modules operable to: receive a list of one or more obfuscated target identifiers from a monitoring node, where each obfuscated target identifier of the one or more obfuscated target identifiers is a user identifier of a target user that is encrypted using a first encryption key that is unknown to the network node; receive an encrypted packet from an element that operates to intercept traffic on another network node in the cellular communications network, where the encrypted packet is a concatenation of an encrypted user identifier, which is a user identifier encrypted using the first encryption key, and an encrypted data block, which is a block of data associated with the user identifier where the block of data is encrypted using the first encryption key; determine whether the encrypted user identifier of the encrypted packet matches one of the one or more obfuscated target identifiers; and, if the encrypted user identifier of the encrypted packet matches one of the one or more obfuscated target identifiers, further encrypt the encrypted packet using a second encryption key negotiated between the network node and the monitoring node to thereby provide a further encrypted packet and transmit the further encrypted packet to the monitoring node. In this manner, monitoring of traffic is provided without exposing the plaintext target identifier even within the cellular communications network.

Embodiments of a method of operation of a network node are also disclosed. In some embodiments, a method of operation of a network node comprises duplicating and encrypting traffic using an encryption key to provide a plurality of encrypted packets. The encryption key is unknown to a middle box node and known to a monitoring node and each encrypted packet is a concatenation of an encrypted user identifier, which is a user identifier encrypted using the encryption key, and an encrypted data block, which is a block of data associated with the user identifier where the block of data is encrypted using the encryption key. The method further comprises transmitting the plurality of encrypted packets to the middle box node.

In some embodiments, the method further comprises negotiating the encryption key with the monitoring node.

In some embodiments, the encryption key is an asymmetric encryption key.

In some embodiments, duplicating and encrypting traffic comprises duplicating and encrypting all traffic of one or more defined types of data for all users. Further, in some embodiments, the one or more defined types of data comprise an intercept related information data type and/or a communication of content type of data. In some embodiments, the one or more defined types of data comprise data related to an attach procedure performed for a wireless device having an associated user identifier, data related to a connection procedure performed for the wireless device having the associated user identifier, data related to a tracking area update performed for the wireless device having the associated user identifier, an IP header for an IP packet to or from the wireless device having the associated user identifier, and/or an IP payload for an IP packet to or from the wireless device having the associated user identifier.

In some embodiments, the method further comprises updating the encryption key to provide an updated version of the encryption key and generating a second encrypted packet using the updated version of the encryption key. The second encrypted packet is a concatenation of a second encrypted user identifier, which is a second user identifier encrypted using the updated version of the encryption key, and a second encrypted data block, which is a block of data associated with the second user identifier where the block of data is encrypted using the updated version of the encryption key. The method further comprises transmitting the second encrypted packet and associated cryptographic information to the middle box node.

In some embodiments, the cryptographic information comprises information that enables the middle box to update an obfuscated target identifier that corresponds to the first encrypted user identifier to obtain an updated obfuscated target identifier that corresponds to the second encrypted user identifier without secret keys.

In some embodiments, the cryptographic information comprises a delta value that represents a difference between the pseudorandom keystream that represents the encryption key and a second pseudorandom keystream that represents the updated version of the encryption key. Further, in some embodiments, the cryptographic information further comprises a sequence number used to generate the updated version of the encryption key. In some embodiments, the encryption key is a pseudorandom keystream generated via AES in counter mode.

Embodiments of a network node to provide monitoring of cellular network traffic are also disclosed. In some embodiments, a network node is adapted to duplicate and encrypt traffic using an encryption key to provide a plurality of encrypted packets. The encryption key is unknown to a middle box node and known to a monitoring node and each encrypted packet is a concatenation of an encrypted user identifier, which is a user identifier encrypted using the encryption key, and an encrypted data block, which is a block of data associated with the user identifier where the block of data is encrypted using the encryption key. The network node is further adapted to transmit the plurality of encrypted packets to the middle box node.

In some embodiments, a network node comprises at least one processor and memory comprising instructions executable by the at least one processor whereby the network node is operable to: duplicate and encrypt traffic using an encryption key to provide a plurality of encrypted packets, where the encryption key is unknown to a middle box node and known to a monitoring node and each encrypted packet is a concatenation of an encrypted user identifier, which is a user identifier encrypted using the encryption key, and an encrypted data block, which is a block of data associated with the user identifier where the block of data is encrypted using the encryption key; and transmit the plurality of encrypted packets to the middle box node.

In some embodiments, a network node comprises one or more modules operable to: duplicate and encrypt traffic using an encryption key to provide a plurality of encrypted packets, where the encryption key is unknown to a middle box node and known to a monitoring node and each encrypted packet is a concatenation of an encrypted user identifier, which is a user identifier encrypted using the encryption key, and an encrypted data block, which is a block of data associated with the user identifier where the block of data is encrypted using the encryption key; and transmit the plurality of encrypted packets to the middle box node.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Radio Node: As used herein, a "radio node" is either a radio access node or a wireless device.

Radio Access Node: As used herein, a "radio access node" or "radio network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network (PDN) Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

Figure 1:
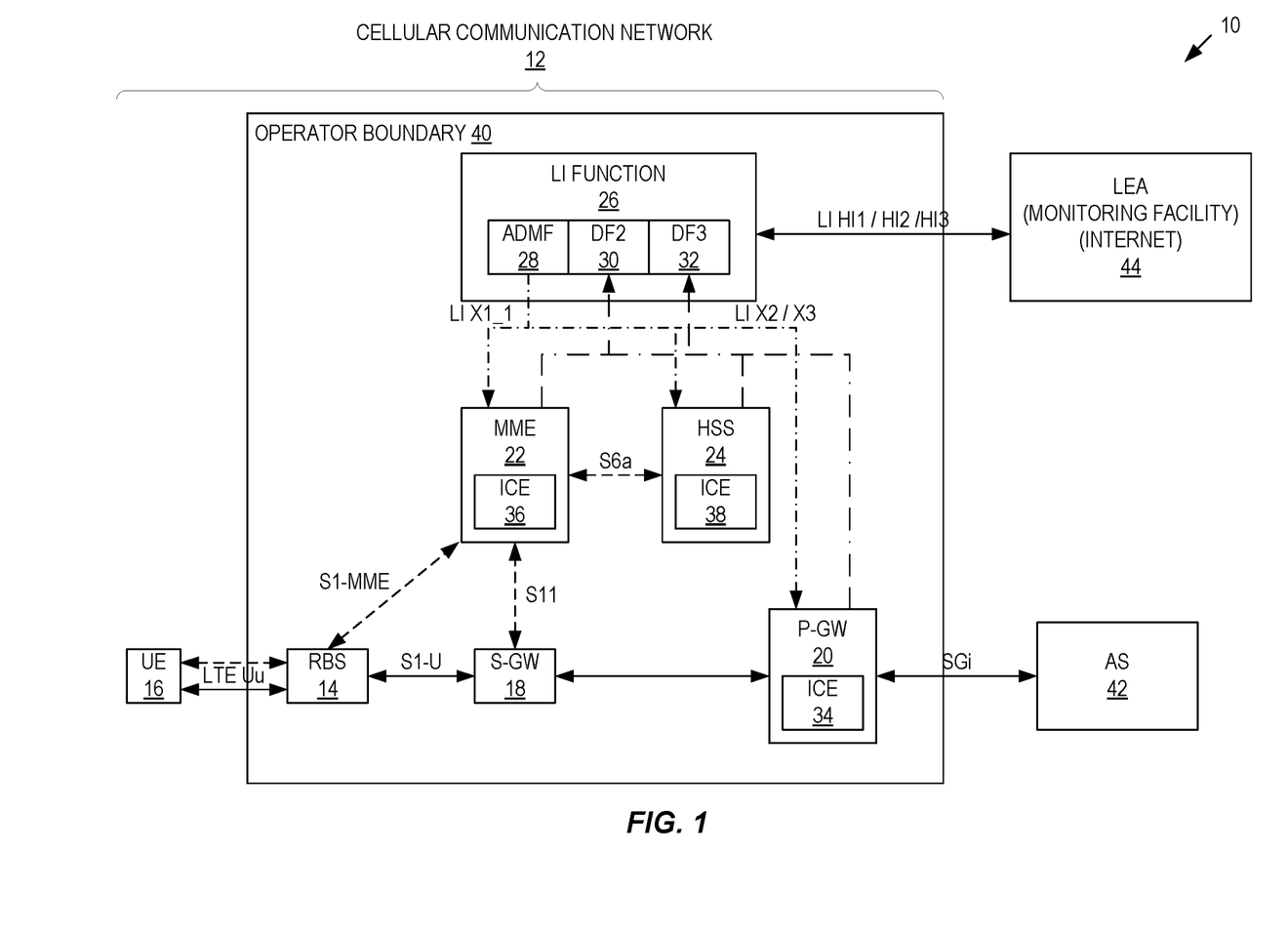
FIG. 1 illustrates a system that includes a Third Generation Partnership Project (3GPP) cellular communications network that provides conventional Lawful Interception (LI)

Before discussing embodiments of the present disclosure, a brief discussion of conventional Lawful Interception (LI) in a 3GPP network and some associated problems is beneficial. In this regard, FIG. 1 illustrates a system 10 that includes a 3GPP cellular communications network 12 that provides conventional LI as specified in 3GPP Technical Specification (TS) 33.107 (see, e.g., version 14.0.0). The cellular communications network 12 includes a Radio Base Station (RBS) 14 providing radio access to a UE 16. The RBS 14 is part of the RAN. The RBS 14 has both User Plane (UP) and Control Plane (CP) interfaces to a core network. As illustrated, the core network includes a Serving Gateway (S-GW) 18, a P-GW 20, a MME 22, and a Home Subscriber Service (HSS) 24. The core network also includes a LI function 26, which is implemented on one or more core network nodes. The LI function 26 includes an administration function 28 and delivery functions (DF2 and DF3) 30 and 32. Intercepting Control Elements (ICEs) 34 through 38 are implemented at the P-GW 20, the MME 22, and the HSS 24, respectively, to enable LI of both UP and CP traffic. While not illustrated, in some embodiments, the LI function 26 may include additional or alternative network nodes such as, for example, the S-GW 18.

The RBS 14, the S-GW 18, the P-GW 20, the MME 22, the HSS 24, and the LI function 26 are within an operator boundary 40 (i.e., they are within the control of the network operator). The P-GW 20 is connected to one or more Application Servers (ASs) 42 outside of the operator boundary 40. For LI, the LI function 26 is connected to one or more LEA nodes or Law Enforcement Monitoring Function (LEMF) nodes 44.

3GPP standardizes the LI interface (X1_1, X1_2, X1_3, X2, and X3 interfaces) functions, and requirements in 3GPP TS 33.107 and 3GPP TS 33.106, respectively. Note that the LI X2 interface is different than the X2 interface standardized by 3GPP for communication between RBSs 14 in the RAN.

In 3GPP TS 33.107, there are several Intercept Related Information (IRI) and Communication of Content (CC) types of data to be delivered to the Law Enforcement Agencies (LEAs). For the particular case of a UE LI target, examples of IRI and CC include events such as UE attach, PDN connections, tracking area update, but also Internet Protocol (IP) headers, or even IP payloads. All types of IRI and CC data specified in 3GPP TS 33.107 are assumed to be supported by today's Evolved Packet System (EPS) architecture. Section 12 in 3GPP TS 33.107 specifies that LI UE target Identifier (ID) is transferred by the ICEs to Distribution Functions (DFs) in specific data structures for the corresponding IRI and CC. Note that CC reporting requires IRI reporting to be already activated.

While the present disclosure is not limited thereto, some examples of IRI and CC types of data are:

Section 12.2.1.2 of 3GPP TS 33.107 v14.0.0 provides a list of IRI (Control Plane events), which include the following:
The following events are applicable to the MME:
Attach;
Detach;
Tracking Area/EPS Location Update;
UE requested PDN connectivity;
UE Requested PDN disconnection;
Start of interception with E-UTRAN attached UE.
The following events are applicable to the S-GW and P-GW:
Bearer activation (valid for both Default and Dedicated bearer);
Start of intercept with bearer active;
Bearer modification;
Bearer deactivation;
UE Requested Bearer Resource Modification;
Packet Data Header Information.
The following events are applicable to the HSS:
Serving Evolved Packet System.
HSS subscriber record change;
Cancel location;
Register location;
Location information request.

Section 12.2.2 of 3GPP TS 33.107 v14.0.0 describes a number of CC (User Plane intercepted data). It is shown that the S-GW or P-GW duplicates all packets "without modification" for the given LI target-UE by adding (for the ADMF or LEA purpose): the target identity (LI UE target-ID), correlation number (a number to correlate CC with IRI data), time-stamp (optional), direction (Mobile Terminating traffic or Mobile Originating traffic), UE location if available.

Note that the types of IRI and CC data described above are not exhaustive. It only provides some examples. For instance, Section 12 in 3GPP TS 33.107 discussed above is dedicated to EPS, but other sections cover other systems with similar LI techniques (IMS, GSN, H(e)NB, WLAN, etc.).

In operation, the ICEs 34, 36, 38 receive a LI UE target ID of a LI UE target, which in the example of FIG. 1 is the UE 16, through the X1_1 LI activation events. Note that security of the LI configuration and delivery may be required (see, e.g., Section 8 in 3GPP TS 33.107). The target ID may be, for example, the International Mobile Subscriber Identity (IMSI), International Mobile station Equipment Identities (IMEI), or IP address of the UE 16. Thus, a plaintext LI UE target ID is passed to every ICE 34, 36, 38 that has to perform traffic and event filtering for this target ID. Although the whole LI process may be secured in terms of ICE configuration and IRI/CC provisioning (see, e.g., Section 5.2.1.3 in 3GPP TS 33.106 and Section 8 in 3GPP TS 33.107), the LI UE target ID (e.g., IMSI, IMEI, IP@ address, etc.) is always available on all ICEs 34, 36, 38. Unauthorized internal users might force access to the LI process to extract the target IDs. Specific security mechanisms must be in place to hide such knowledge from unauthorized access. However, authorized users with high security clearances can always access this information (see, e.g., Section 8 in 3GPP TS 33.107).

There are a number of problems associated with the conventional LI mechanisms. A first problem is that, in 3GPP TS 33.107, the activation of the LI process on the core network nodes (i.e., the Evolved Packet Core (EPC) nodes)—specifically on the ICEs implemented on the core network nodes—and delivery of IRI and CC data rely on a data structure that always contains the LI UE target ID. These target IDs are activated on each ICE. However, the fact that the LI target ID, which is sensitive data, is spread within the core network is a vulnerability. The LI target ID could eventually be obtained from several points in the network by an internal malicious user. The operator has to enforce access control on the LI process at least through high security clearance of the authorized personnel. Mechanisms to prevent the (un)intentional access to sensitive data (LI target or non-target) should be in place and authorized personnel should be trained accordingly. Solutions to relax or eliminate such requirements of high security clearances are left as open problems. Furthermore, Internet Service Providers (ISPs) would welcome solutions in which they do not control the LI process. Today, even though the ISP performs LI on request, it is still bad press to have headlines saying that an ISP has proceeded to LI.

A second problem is that the current standard LI architecture introduces LI interfaces extended to almost all core network nodes that consequently encompass more roles (e.g., full blown ICE role) different from the legacy ones. There is no standard proposal to enhance the LI architecture in order to try to maintain the legacy role of every core network node (e.g., keep the P-GW as the data plane anchor with reduced ICE functionality).

A third problem is that, today, an operator may deploy LI by dumping/duplicating all the traffic towards the LEA, thus entrusting the LEA to filter and isolate the IRI/CC data related to an LI target-ID. It turns out that the LEA is provided with too much data to be filtered and processed, which becomes a real cumbersome task to say the least.

Systems and methods are disclosed herein that ensure that: (1) the LI UE target ID is never present in clear/plaintext anywhere in the operator network during the LI process (i.e., LI activation and IRI/CC delivery do not use a plaintext UE target ID Information Element (IE) as defined in 3GPP TS 33.107) and (2) protect the LI UE target ID against inference by internal users. Importantly, while the discussion herein focuses on LI, the systems and methods disclosed herein are not limited thereto. Rather, the systems and methods disclosed herein can be used for data collection by monitoring traffic in a wireless communication system.

Embodiments of the present disclosure utilize a "hub-and-spoke" architecture and a specific encryption scheme. The ICEs (the "spokes") share an encryption key with the LEA node. This key is used to encrypt the target ID and associated data structure. The ICEs mirror their traffic data after encrypting it towards a new functional entity that is referred to herein as a LI Middle-Box (LIMB) (the "hub"). The LIMB can be placed inside or outside the operator boundaries.

LIMB does not share the key with ICEs and LEA node. In other words, the key utilized to encrypt data shared from the ICEs to the LEA is not known by the LIMB. The LIMB performs filtering on the encrypted traffic received from the ICEs. This filtering is based on keyword matching with an obfuscated (i.e., encrypted) LI UE target ID received from the LEA node. The LIMB cannot decrypt the obfuscated target ID since the key is not shared with the LIMB. The selected LI target ID data is transferred to the LEA node, e.g., after another encryption. This encryption is preferred so that the target ID cannot be inferred by internal users. The LEA node is able to decrypt the encrypted traffic and obtain the target ID data.

In some embodiments, the ICE and the LIMB also support updating the obfuscated target ID based on which keyword matching is performed and without any key exchanges. This may be beneficial for embodiments in which the encryption/decryption key used between the ICE and the LEA node are evolved.

Solving the aforementioned problems, one can see the following non-limiting advantages. For the mobile operator, the LI deployment does not require those high security clearance levels for LI authorized personnel, the LI UE target ID is never received by the operator in clear/plaintext such that the level of data sensitiveness in the LI process is highly reduced, the LI architecture is extensible (e.g., the LIMB could be deployed in both the mobile operator network and outside its boundaries, i.e., in a third party cloud provider, while maintaining (if not increasing) the security level of the whole process), and the core network nodes have a reduced ICE role, the LI interfaces terminating on them being simplified. For the LEA/LEMF, the process of LI is more transparent and there is less overhead in target ID notification to the operator.

The proposed model can be further extended by allowing a third party to dictate the target ID and another party to perform the selection of target ID traffic (e.g., to avoid collusions of third parties).

Figure 2:
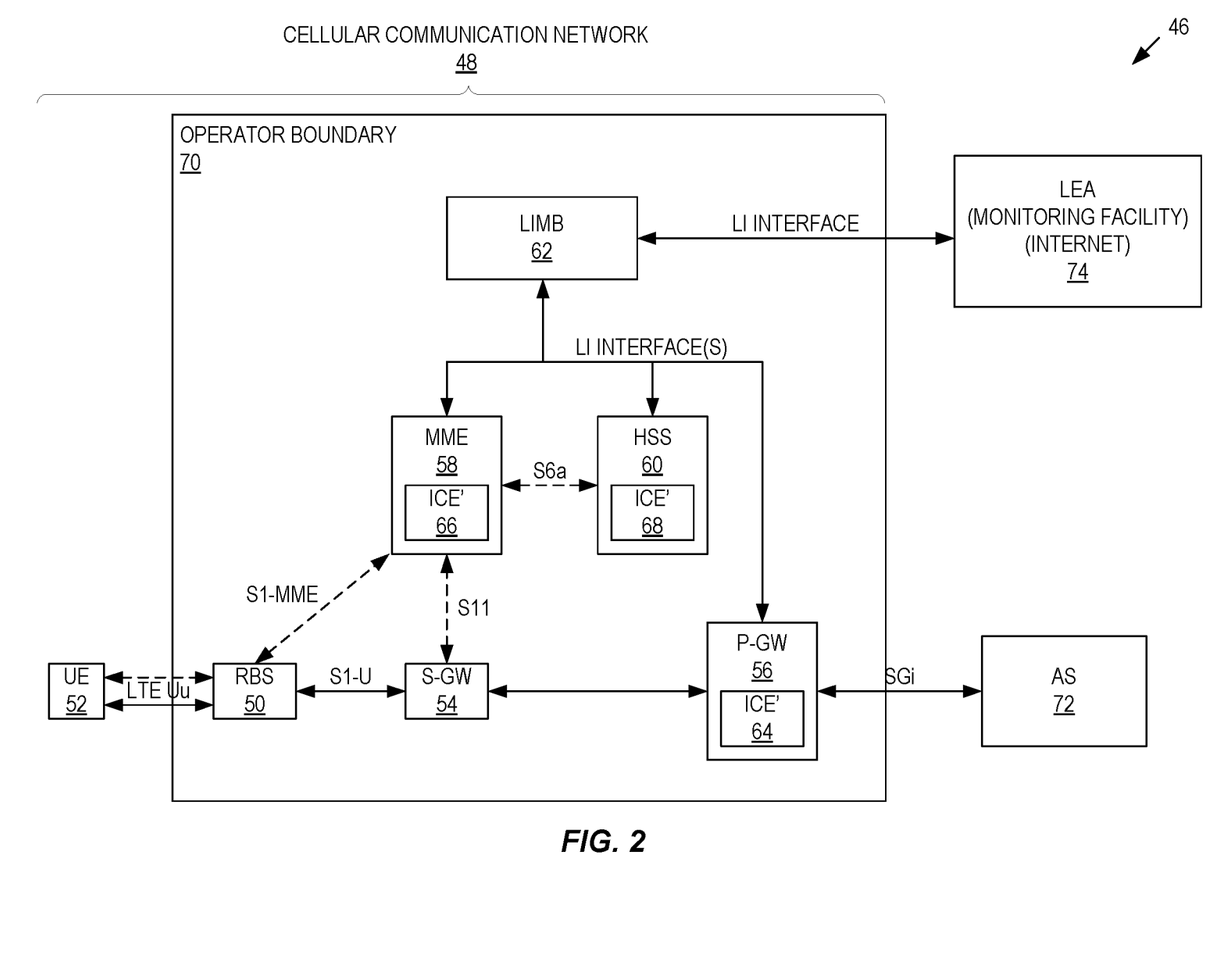
FIG. 2 illustrates one example of a system that includes a cellular communications network that provides conventional LI according to at least some embodiments of the present disclosure.

FIG. 2 illustrates one example of a system 46 that includes a cellular communications network 48 that provides conventional LI according to at least some embodiments of the present disclosure. In the described example embodiments, the cellular communications network 48 is a 3GPP cellular communications network (e.g., an LTE network); however, the embodiments described herein are equally applicable to other types of cellular communications networks such as a 5G or NR network.

The cellular communications network 48 includes a RBS 50 providing radio access to a UE 52. The RBS 50 is part of the RAN. The RBS 50 has both UP and CP interfaces to a core network. In this example, the core network includes a S-GW 54, a P-GW 56, a MME 58, and a HSS 60. The core network also includes a LIMB 62, which is implemented on one or more core network nodes. ICEs 64 through 68, which are referred to here as ICE' 64, ICE' 66, and ICE' 68 to distinguish them from the conventional ICEs, are implemented at, in this example, the P-GW 56, the MME 58, and the HSS 60, respectively, to enable LI of both UP and CP traffic. Note that the ICE's may be implemented at any desirable core network node or any radio access node. The P-GW 56, the MME 58, and the HSS 60 are only examples.

The RBS 50, the S-GW 54, the P-GW 56, the MME 58, the HSS 60, and the LIMB 62 are within an operator boundary 70 (i.e., they are within the control of the network operator). In some alternative embodiments, the LIMB 62 is outside of the operator boundary 70. The P-GW 56 is connected to one or more ASs 72 outside of the operator boundary 70. For LI, the LIMB 62 is connected to one or more LEA nodes or LEMF nodes 74, which are more generally referred to as one or more monitoring nodes.

As discussed below in detail, the LIMB 62, the ICE's 64 through 68, and the LEA node 74 operate to provide LI in such a manner that the LI UE target ID (i.e., the ID of the UE 52 that is the target of the LI) is never transmitted in clear/plaintext within the operator network (i.e., never transmitted from the ICE's 64, 66, 68 to the LIMB 62) or by the LEA node 74 at LI activation. Only an obfuscated form of the LI UE target ID, which is referred to herein as obf-target-ID, is transmitted. However, the clear/plaintext LI UE target ID cannot be obtained from the obf-target-ID nor inferred within the operator's network.

Given an obf-target-ID in the operator network, only LI data (e.g., CC/IRI data) associated to the corresponding target ID is filtered and transmitted to the LEA node 74. However, the filtered data does not give any useful indication to infer target ID in the operator network.

In this regard, two particular mechanisms to be implemented in order to successfully meet these requirements are: (1) a mechanism to derive obf-target-ID from a plaintext LI UE target ID that is to be used in the LI process instead of plaintext LI UE target ID and (2) a mechanism to select the LI data (IRI/CC) corresponding to an obfuscated obf-target-ID that has to be transmitted to LEA.

Figure 3:
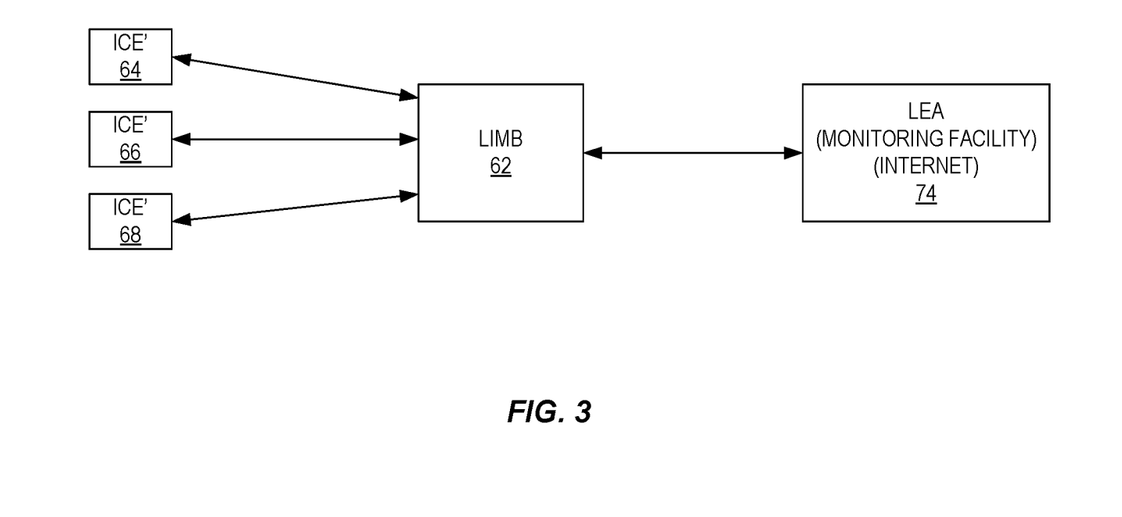
FIG. 3 is a simplified illustration of the LI architecture of FIG. 2.

Before discussing these two mechanisms, a brief overview of the architecture of FIG. 2 is beneficial. A simplified version of the LI architecture is illustrated in FIG. 3. The LIMB 62 provides enhanced Administration Function (ADMF)/DF functionality. In some embodiments, the LIMB 62 reuses some parts of the conventional LI procedures (e.g., activate LI, deactivate LI, etc.). However, in contrast to the LI function of the conventional LI architecture, the LIMB 62 performs LI data (IRI/CC data) filtering based on keyword matching with obf-target-ID on data received from the ICE's 64, 66, 68.

The ICE's 64, 66, 68 (i.e., LI functionality deployed on the cellular communications network nodes) are responsible to send all LI traffic to the LIMB 62 after encrypting the LI traffic in a particular way, as described below.

Contrary to the standard 3GPP LI architecture, the ICE's 64 through 68 do not obtain plaintext LI target IDs. Moreover, the obf-target-ID(s) is present only on the LIMB 62.

The LEA node 74 is similar to the conventional LEA node/LEMF. However, data sent to the LIMB 62 to control the LI process is different than what is conventionally sent. One important change is that the LEA node 74 sends the obf-target-ID to the LIMB 62 rather than the plaintext LI UE target ID.

In some embodiments, the data received by the LEA node 74 from the LIMB 62 is semantically the same as in the conventional 3GPP LI, i.e., the IRI/CC data corresponding to obf-target-ID(s) and thus associated to a target ID. In other words, from the LEA's perspective, the intercepted information has the same meaning as if it was intercepted by the legacy LI scheme.

Using the architecture of FIGS. 2 and 3, the obf-target-ID(s) are contained in a restrained perimeter, i.e., contained in the LIMB 62. To reduce the likelihood of inferring the target ID from the output of the LIMB 62, the obf-target-ID can be systematically varied for a given LI UE target ID. Thus, in some embodiments, for a given LI UE target ID, the corresponding obf-target-ID is a variable with changing values that do not require retransmission from LEA/LEMF or any key exchanges, and the LIMB 62 updates the obf-target-ID to perform keyword matching on it correctly. This relates to a best practice/principle in cryptography, which is evolving the (symmetric) encryption keys used by two parties in a session. Given that filtering/keyword matching is done on traffic encrypted by the ICE's 64, 66, 68 usually with changing keys (or keystreams), obf-target-ID must be updated accordingly without exchange of keys between ICE's 64, 66, 68 and the LIMB 62. Note that the embodiments described herein do not exclude having the LIMB 62-LEA/LEMF link designed to sustain a real-time retransmission of obf-target-ID by the LEA/LEMF.

Mechanism 1

Every ICE' 64, 66, 68 initiates and negotiates a symmetric encryption key with the LEA node 74. The key negotiation is triggered by some signal from the LIMB 62 (e.g., one LI activation event) broadcasted to all pertinent ICE's 64, 66, 68. This key is not shared with the LIMB 62. For instance, let us refer to ICE's 64, 66, and 68 and ICE' A, ICE' B, and ICE' C, respectively. For each ICE'$_X$, the ICE'$_X$ establishes a secret, encryption key (key$_{ICE\_X}$) with the LEA node 74, e.g., through Diffie-Hellman primitives. Thus, ICE' A establishes a key (key$_{ICE\_A}$) with the LEA node 74, the ICE' B establishes a key (key$_{ICE\_B}$) with the LEA node 74, and ICE' C establishes a key (key$_{ICE\_C}$) with the LEA node 74. When desiring LI for a particular target-ID (target-ID$_M$), the LEA node 74 uses the keys (key$_{ICE\_A}$, key$_{ICE\_B}$, and key$_{ICE\_C}$) to encrypt the target ID (target-ID$_M$) to provide corresponding obf-target-IDs, which are referred to as obf-target-ID$_{MA}$, obf-target-ID$_{MB}$, and obf-target-ID$_{MC}$. Generally, the target-ID$_M$ is obfuscated through a transformation using key$_{ICE\_X}$ as follows:

$$\text{obf-target-ID}_{MX}=\text{func}(\text{target-ID}_M, \text{key}_{ICE\_X}),$$

where func is preferred to be an encryption algorithm. For instance, Advanced Encryption Standard (AES)-128 is suitable if the UE target ID type is an IP version 6 (IPv6) (128 bit) address, since UEs receive unique IPv6 prefixes.

In some embodiments, key negotiation between the ICE's 64, 66, and 68 and the LEA node 74 is not performed often since key$_{ICE\_X}$ (or keystreams generated by the master secret, here key$_{ICE\_X}$) is systematically updated. For instance, this update can be done based on the volume of data. As an example, this updating may work like the Sequence Number (SN) in Transmission Control Protocol (TCP), IP Security (IPsec), Data Transport Layer Security (DTLS) (or the EPS Encryption Algorithm (EEA) algorithms 3GPP TS 33.401 and the SN IE in Packet Data Convergence Protocol (PDCP) Protocol Data Units (PDUs) (see, e.g., 3GPP TS 36.323) to avoid reusing the same encryption key).

The LIMB 62 is provisioned with all relevant obf-target-ID$_{MX}$ by the LEA node 74 associated to all types of LI UE targets (IMSI, IMEI, IP@, etc.). Note that a single UE 52 may have multiple IDs (e.g., IMSI, IMEI, IP@, etc.) and, as such, the LEA node 74 may provide multiple obf-target-IDs for the same target UE (i.e., a separate obf-target-ID for each possible target ID type for each key$_{ICE\_X}$). The obf-target-ID$_{MX}$ pseudo random numbers cannot be reversed in the operator boundary 70. In some embodiments, the LIMB 62 is able to update obf-target-ID$_{MX}$ without being re-provisioned and without knowledge of the key$_{ICE\_X}$ keys, as discussed below.

Mechanism 2

LI activation includes transmission, by the LEA node 74, of a set of obf-target-ID$_{MX}$ values to the LIMB 62. Conversely, for LI deactivation, the LEA node 74 explicitly removes any obf-target-ID$_{MX}$ values for which LI is to be deactivated from the set of obf-target-ID$_{MX}$ values monitored by the LIMB 62. As long as the LIMB 62 maintains at least one obf-target-ID$_{MX}$, i.e., there is at least one active LI UE target, the ICE's 64, 66, and 68 provide their encrypted LI data to the LIMB 62, as discussed below.

ICE'$_X$ operations during LI: Rather than providing LI data to the LIMB 62 in packets containing the plaintext target ID as is conventionally done, the ICE'$_X$ (e.g., the ICE' 64, the ICE' 66, or the ICE' 68) provides an encrypted packet schematically represented by:

$$enc_{pkt\_X}=[enc_{UE\text{-}ID}|enc_{IRI/CC}],$$

where "|" means concatenation, $enc_{UE\text{-}ID}$=func (UE-ID, $key_{ICE\_X}$) with func( ) being the function mentioned above that is used to compute the corresponding obf-target-ID and UE-ID being the ID of a particular UE, and $enc_{IRI/CC}$=func (IRI/CC, $key_{ICE\_X}$) where IRI/CC is the LI data for the UE having the respective UE-ID. In this manner, the UE-ID and the LI data are separately encrypted using $key_{ICE\_X}$. Note that, in some embodiments, the ICE'$_X$ provides all LI data for all UEs (not just LI target IDs) to the LIMB 62 using this encrypted packet structure. In other words, UE-ID means any/all UE IDs available in the UE contexts stored by the given network node for which IRI/CC could be generated. In this manner, the ICE'$_X$ duplicates all LI related CP and/or UP traffic to the LIMB 62 in accordance with the above encrypted packet structure.

Optionally, the ICE'$_X$ may indicate a type of UE-ID (e.g., IMSI type, IMEI type, IP@ type) used for the encrypted packet to speed up keyword matching at the LIMB 62. These types could be, for instance, those specified in Perkins, C. et al., "MN Identifier Types for RFC 4283 Mobile Node Identifier Option," Internet Engineering Task Force (IETF), Jan. 17, 2017 and should be known by all parties (ICE', LIMB, LEA).

As discussed below in detail, in some embodiments, there is another optional indication added to an encrypted packet that is used by the LIMB 62 to update obf-target-ID when $key_{ICE\_X}$ is updated.

LIMB operations during LI: The LIMB 62 receives encrypted packets ($enc_{pkt\_X}$) from all ICE$_X$' and performs keyword matching on obf-target-ID$_{MX}$ and $enc_{UE\text{-}ID}$. For each encrypted packet ($enc_{pkt\_X}$), if bitwise $enc_{UE\text{-}ID}$=obf-target-ID$_{MX}$ (i.e., equals any obf-target-ID$_{MX}$ in the set of obfuscated target IDs provided to the LIMB 62 from the LEA node 74), then there is a matching and, as such, the LIMB 62 forwards either $enc_{pkt\_X}$ or the $enc_{IRI/CC}$ part of $enc_{pkt\_X}$ to the LEA node 74. More specifically, the LIMB 62 either: (a) transmits $enc_{pkt\_X}$ to the LEA node 74 or (b) transmits only the $enc_{IRI/CC}$ portion of $enc_{pkt\_X}$ in which case the LIMB 62 embeds an index of the obf-target-ID in the set of obfuscated target IDs provided by the LEA node 74. However, simply outputting $enc_{IRI/CC}$ to the LEA node 74 may allow target ID inference by decrypting the LIMB's 62 output with $key_{ICE\_X}$. To overcome this operator internal attack, in some embodiments, the LIMB 62 and the LEA node 74 use an extra encryption layer to further encrypt $enc_{IRI/CC}$ with either a different symmetric secret key or with the LEA node's 74 public key. In some other embodiments, a proxy re-encryption-like operation is employed; however, proxy re-encryption for standard symmetric algorithms (e.g., AES) is not currently available.

If the LIMB 62 further encrypts the LI data before transmitting it to the LEA node 74, the LEA node 74 performs LI UE target ID data extraction by first decrypting the encrypted packets received from the LIMB 62 using either the secret key shared with the LIMB 62 or its private key in case of LIMB asymmetric encryption. Then, the LEA node 74 decrypts $enc_{IRI/CC}$ with the $key_{ICE\_X}$, which is the encryption key associated with the received obf-target-ID$_{MX}$ or with the received obf-target-ID$_{MX}$ index.

Example LI Operation

Figure 4A:
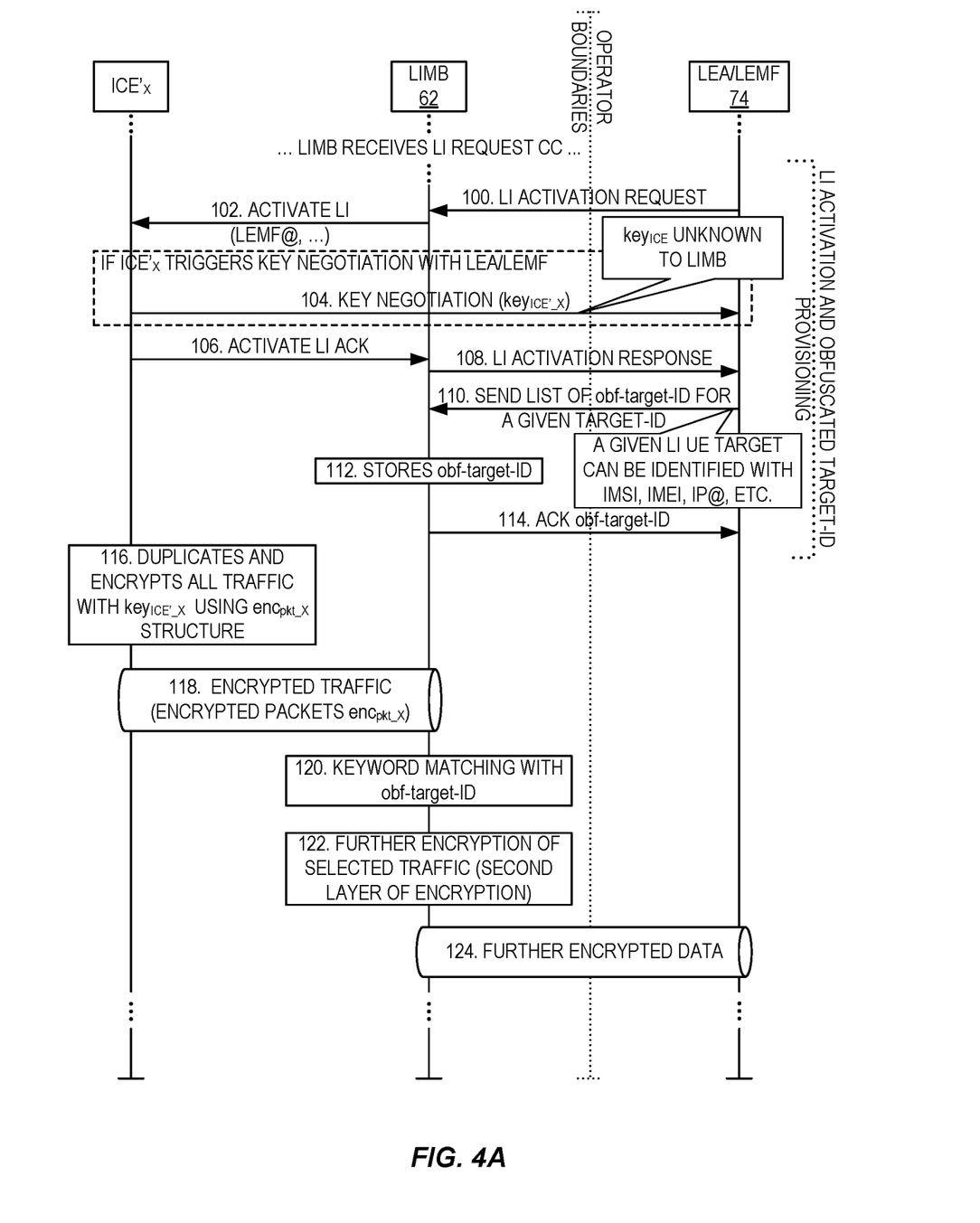
FIGS. 4A and 4B illustrate the operation of system of FIGS. 2 and 3 according to some embodiments of the present disclosure.
Figure 4B:
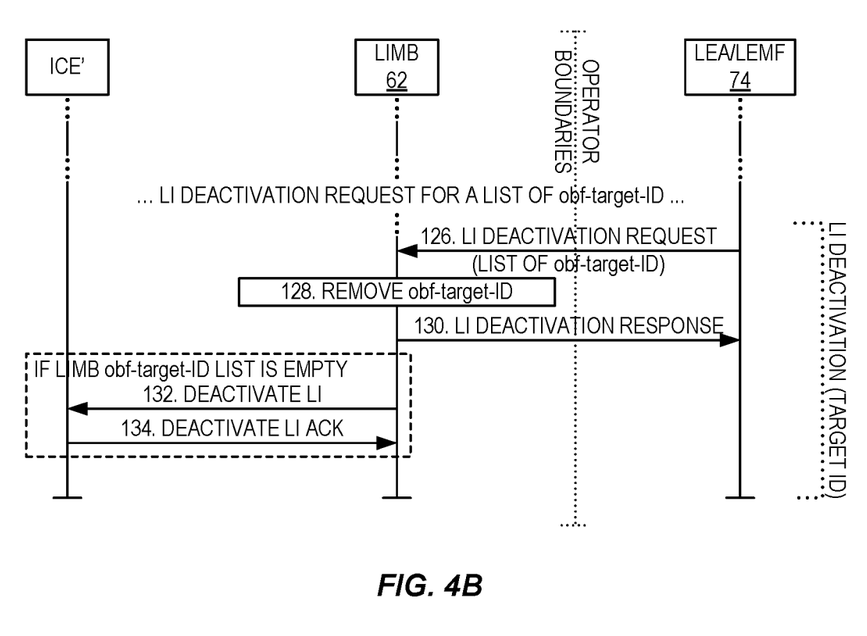

FIGS. 4A and 4B illustrate the operation of the LIMB 62, the ICE'$_X$, and the LEA node 74 according to at least some of the embodiments described above. Again, ICE'$_X$ is, in the example architecture of FIGS. 2 and 3, either the ICE' 64, the ICE' 66, or the ICE 68'. Note that only one ICE' is shown in FIGS. 4A and 4B for clarity and ease of discussion; however, the process is equally applicable to all of the ICE's 64, 66, and 68.

As illustrated, the LEA node 74 provides a LI activation request to the LIMB 62 (step 100) and the LIMB 62 activates LI at the ICE'$_X$ (step 102), e.g., in the conventional manner. In this example, symmetric encryption is used. As such, the ICE'$_X$ negotiates an encryption key ($key_{ICE'\_X}$) with the LEA node 74 (step 104). Importantly, as discussed above, $key_{ICE'\_X}$ is unknown to the LIMB 62. The ICE'$_X$ sends an LI activation acknowledgement to the LIMB 62 to acknowledge that LI has been activated (step 106), and the LIMB 62 then sends an LI activation response to the LEA node 74 to indicate that LI is activated (step 108).

The LEA node 74 sends a list of obf-target-IDs for desired LI UE target ID to the LIMB 62 (step 110). This list of obf-target-IDs includes, e.g., multiple obf-target-IDs generated from the same LI UE target ID using the different encryption keys ($key_{ICE'\_X}$) for the different ICE's. In addition, if the particular target has multiple target IDs of different types, then the list of obf-target-IDs may also include different obf-target-IDs generated for the different ID types. The LIMB 62 stores the obf-target-IDs (step 112) and sends an acknowledgement to the LEA node 74 (step 114).

The ICE'$_X$ duplicates and encrypts all LI related traffic using $key_{ICE'\_X}$ and the $enc_{pkt\_X}$ structure, as discussed above (step 116). The ICE'$_X$ transmits the encrypted packets to the LIMB 62 (step 118). The LIMB 62 then performs keyword matching between the $enc_{UE\text{-}ID}$ values contained in the encrypted packets received from the ICE'$_X$ and the obf-target-IDs in the list received from the LEA node 74 and stored at the LIMB 62 (step 120). For each encrypted packet for which $enc_{UE\text{-}ID}$ matches one of the obf-target-IDs, the LIMB 62 then provides that encrypted packet or at least the $enc_{IRI/CC}$ portion of that encrypted packet to the LEA node 74. More specifically, in this example, for each encrypted packet for which $enc_{UE\text{-}ID}$ matches one of the obf-target-IDs, the LIMB 62 further encrypts the encrypted packet or the $enc_{IRI/CC}$ portion of that encrypted packet to provide a further encrypted packet, as discussed above (step 122). The LIMB 62 transmits the further encrypted packet to the LEA node 74 (step 124). The process proceeds in this manner as new encrypted packets are received from the ICE'$_X$ and filtered by the LIMB 62 using keyword matching of the $enc_{UE\text{-}ID}$ values contained in the encrypted packets received from ICE'$_X$ and the obf-target-IDs in the list received from the LEA node 74 and stored at the LIMB 62.

At some point, the LEA may desire to cease LI for a target ID. In this case, the LEA node 74 sends a LI deactivation request including a list of obf-target-IDs corresponding to the target ID(s) that are no longer to be monitored (step 126). The LIMB 62 then removes the obf-target-IDs from storage (step 128) and sends a LI deactivation response to the LEA node 74 to confirm deactivation (step 130). If the LIMB 62 has no more obf-target-IDs to monitor, then the LIMB 62 sends an instruction to the ICE'$_X$ to deactivate LI (step 132). The ICE'$_X$ sends an acknowledgement to the LIMB 62 to confirm that LI has been deactivated (step 134).

Note that the embodiment of FIGS. 4A and 4B utilizes symmetric encryption. However, in some alternative embodiments, asymmetric encryption may be used. For asymmetric encryption, step 104 is not needed. The ICE'$_X$ encrypts all traffic with a given public key for which the private key is not used anywhere in the network. The LIMB 62 performs an asymmetric proxy re-encryption without knowledge of any secret private keys. Also, the LIMB 62 performs keyword matching on local obf-target-ID issued by the LEA node 74 from the target ID encrypted with LEA node's 74 public key. A similar $\text{enc}_{pkt\_X}$ structure would be used. Note that the proxy re-encryption would rely on some knowledge partly derived from the key pairs of the LEA node 74 and the other party, e.g., as determined in Blaze, M. et al., "Divertible Protocols and Atomic Proxy Cryptography," Proceedings of Eurocrypt '98, vol. 1403, pages 127-144, 1998.

As discussed above, in some embodiments, it is desirable for the encryption key ($k_{ICE'\_X}$), and thus obf-target-ID, to be updated, or evolved, over time. Specifically, cryptographic properties are used to enable the LIMB 62 to update all the obfuscated target IDs. In this case, the LEA node 74 does not provide a new set of obfuscated target IDs. Instead, the LIMB 62 updates the obfuscated target IDs based on cryptographic information obtained from the ICE'$_X$. The cryptographic properties are similar to homomorphic properties, and the discussion below illustrates how to update these values such that:

new_obfuscated-target-ID=old_obfuscated-target-ID+ Delta, where "+" is an operator and Delta is a value obtained by the LIMB 62.

As discussed above, obf-target-ID$_{MX}$=func(target-ID$_M$,key$_{ICE\_X}$), where func is preferred to be an encryption algorithm. For instance, AES-128 is suitable if the UE target ID type is an IPv6 address. Here, obf-target-ID is a variable with changing values that do not require retransmission from the LEA node 74 or key exchanges. For example, in some embodiments, key$_{ICE\_X}$ evolution is based on encrypted data volume. Obf-target-ID can be updated as follows. First, the encryption algorithm (func) at ICE' level is chosen in a way that allows obf-target-ID to be updated just from a delta variation function on key$_{ICE\_X}$:

DeltaFunc(obf-target-ID)=DeltaFunc'(func(target-ID$_M$,DeltaFunc"(key$_{ICE\_X}$))

These DeltaFunc'( ) variations should be pseudo-random so that no indication to key$_{ICE\_X}$ is possible. Thus, DeltaFunc'( ) should not be (easily) reversible.

Second, and consequently, ICE'$_X$ appends (or prepends) the DeltaFunc' values following the key$_{ICE\_X}$ variations to the enc$_{pkt\_X}$ packet so that the LIMB 62 becomes aware of the need to update obf-target-ID$_{MX}$ via DeltaFunc( ). Additionally, the LEA node 74 is also informed of these updates so that key$_{ICE\_X}$ is updated at the LEA node 74 to allow proper decryption. Since DeltaFunc'( ) is not (easily) reversible, only the delta values are not enough to be forwarded to the LEA node 74 which requires indication of key$_{ICE\_X}$ update (both for obf-target-ID and for the decryption key). Thus, key$_{ICE\_X}$ should take an extra parameter to be computed on, such as an incrementing SN (e.g., the SN IE in PDCP PDUs as specified in 3GPP TS 36.323) that is safe to communicate in the clear and that is appended to enc$_{pkt\_X}$ by ICE' for transfer from the LIMB 62 to the LEA node 74.

It is important to choose the right algorithm func( ) that allows such delta properties. One non-limiting example for func( ) is AES in Counter mode.

When using AES in Counter mode, a pseudorandom keystream (with which plaintext is XOR-ed to obtain the ciphertext) would represent key$_{ICE\_X}$, and keystream deltas-consecutive keystreams that are XOR-ed, i.e., the DeltaFunc" function—would be transferred (still pseudorandom) to the LIMB 62 in the enc$_{pkt\_X}$ structure. The LIMB 62 then XORs obf-target-ID$_{MX}$ with this delta to update obf-target-ID$_{MX}$. The LIMB 62 also sends the SN, which is obtained from the ICE'$_X$, to the LEA node 74, where the LEA node 74 uses the SN to update the key$_{ICE'\_X}$ at the LEA node 74. Note that SN should be long enough to avoid cyclic errors given that not any enc$_{pkt\_X}$ results into a packet sent to the LEA node 74 (i.e., only packets for which keyword matching is true are transmitted from the LIMB 62 to the LEA node 74). Note that, alternatively, a generic solution like a symmetric proxy re-encryption can be used to update the obfuscated target IDs.

Figure 5:
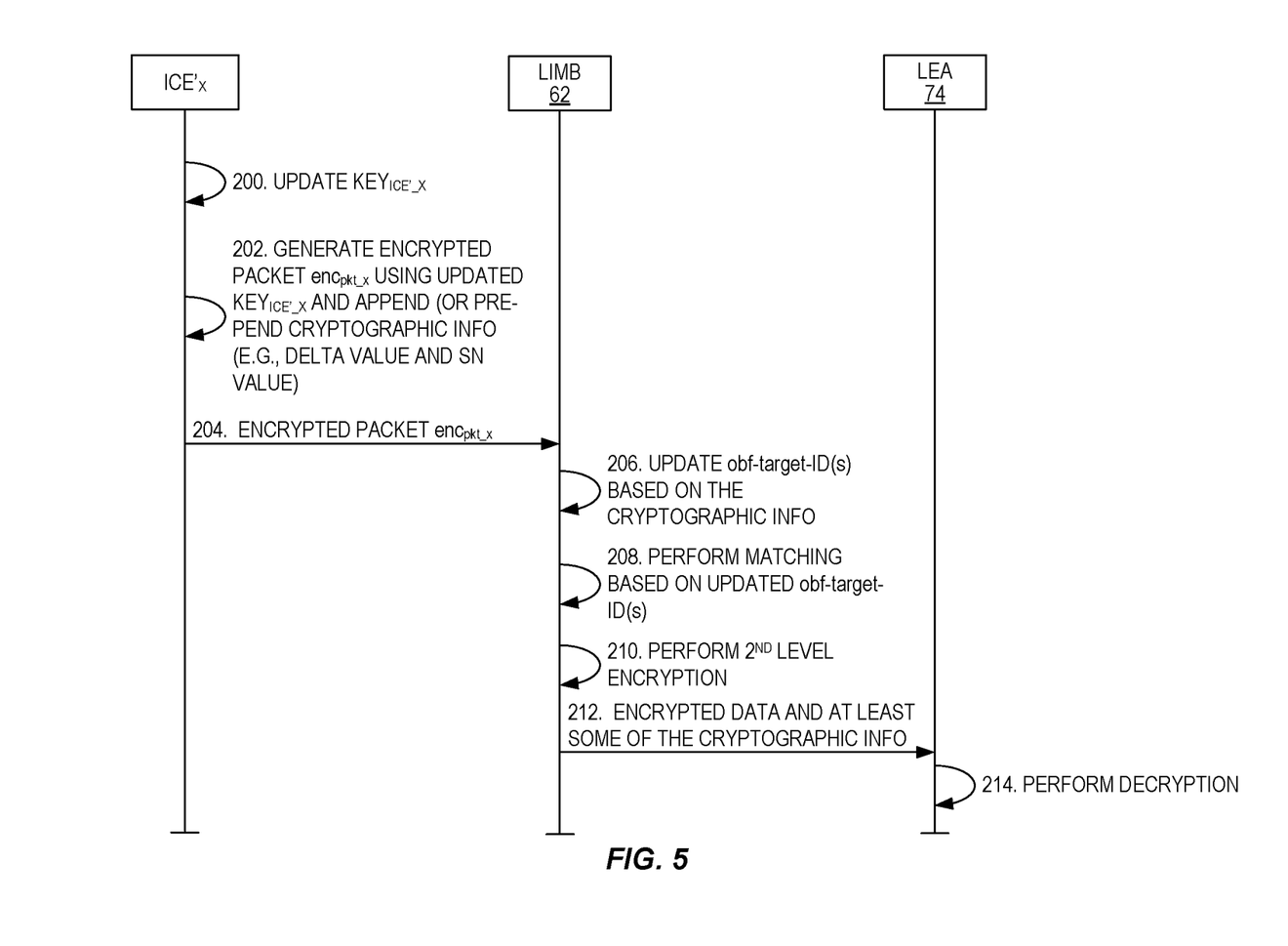
FIG. 5 illustrates one example of the operation of the system of FIGS. 2 and 3 to update an obfuscated target identifier according to some embodiments of the present disclosure.

One example of the operation of the LI system to enable updating of the obf-target-ID(s) is illustrated in FIG. 5. As illustrated, the ICE'$_X$ updates its key$_{ICE'\_X}$ (step 200). For example, updating, or evolving, of key$_{ICE'\_X}$ may be triggered based on volume of encrypted data. The ICE'$_X$ generates an encrypted packet enc$_{pkt\_X}$ using the updated key$_{ICE'\_X}$ and appends (or pre-pends) cryptographic information to the encrypted packet (step 202). When using AES in Counter modes as the encryption scheme, the cryptographic information includes: (1) a delta value representing the difference between the current pseudorandom keystream (i.e., the current or updated key$_{ICE'\_X}$) and the previous pseudorandom keystream (i.e., the previous key$_{ICE'\_X}$) and (2) the SN used to generate the current pseudorandom keystream.

The LIMB 62 updates the obf-target-ID(s) based on the cryptographic information (step 206). Note that the cryptographic information can be used an as indication to the LIMB 62 that the obf-target-ID(s) need to be updated. Alternatively, the ICE'$_X$ may provide a separate indication to the LIMB 62 to inform the LIMB 62 that the obf-target-ID (s) need to be updated. Again, using AES in Counter mode as an example, the LIMB 62 XORs the delta value with the obf-target-ID(s) to obtain the updated obf-target-ID(s). The LIMB 62 then performs keyword matching between the enc$_{UE\text{-}ID}$ and the updated obf-target-ID(s) to determine whether there is a match (step 208). If there is a match, the LIMB 62 performs further encryption of either the encrypted packet enc$_{pkt\_X}$ or the encrypted LI data part enc$_{IRI/CC}$ of the encrypted packet (step 210) and transmits the resulting further encrypted packet to the LEA node 74, as discussed above (step 212). However, in step 212, the LIMB 62 also transmits at least a portion of the cryptographic information (e.g., the SN) received from the ICE'$_X$ to the LEA node 74 to thereby enable the LEA node 74 to update the key$_{ICE'\_X}$ at the LEA node 74. The LEA node 74 updates the key$_{ICE'\_X}$ at the LEA node 74 and then performs decryption of the received packet using the updated key$_{ICE'\_X}$ (step 214).

Note that while, in some embodiments, the LIMB 62 is deployed on one or more network nodes within the operator boundary 70, the LIMB 62 may alternatively be deployed in a third party cloud that offers sufficient computing resources for keyword matching and, optionally, for the second layer of encryption with the LEA node 74. Actually, the second layer of encryption is optional if it is proved that the operator and the cloud provider do not collude. That is because the LIMB 62 receives encrypted traffic for which no decryption key is available. Also, no clear target ID can be extracted within the LIMB perimeter. As another alternative, the LIMB 62 can be deployed in different network slices, one slice per every ICE'.

Figure 6:
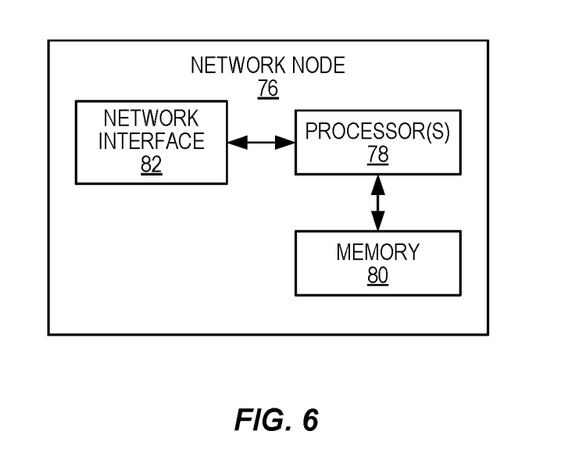
FIGS. 6 and 7 illustrate example embodiments of a network node.

FIG. 6 illustrates one example of a network node 76. In some embodiments, the network node 76 is a network node on which an ICE' 64, 66, or 68 is deployed. In some other embodiments, the network node 76 is a network node on which the LIMB 62 is deployed. As illustrated, the network node 76 includes one or more processors 78 (e.g., one or more Central Processing Units (CPUs), one or more Digital Signal Processors (DSPs), one or more Application Specific Integrated Circuits (ASICs), one or more Field Programmable Gate Arrays (FPGAs), and/or the like), memory 80, and a network interface 82. In some embodiments, the functionality of the ICE' 64, 66, or 68 is fully or partially implemented in software that is stored in the memory 80 and executed by the processor(s) 78. In some other embodiments, the functionality of the LIMB 62 is fully or partially implemented in software that is stored in the memory 80 and executed by the processor(s) 78.

In some embodiments, a computer program including instructions which, when executed by at least one processor, causes the at least one processor to carry out the functionality of the ICE' 64, 66, or 68 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

In some embodiments, a computer program including instructions which, when executed by at least one processor, causes the at least one processor to carry out the functionality of the LIMB 62 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 7:
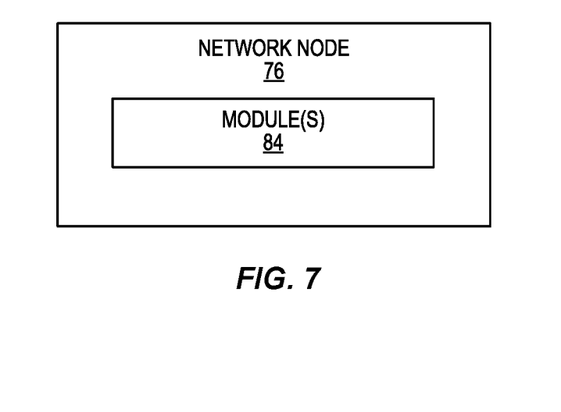

FIG. 7 is a schematic block diagram of the network node 76 according to some other embodiments of the present disclosure. The network node 76 includes one or more modules 84, each of which is implemented in software. The module(s) 84 provide the functionality of the network node 76 described herein. For example, if the network node 76 deploys the ICE' 64, 66, or 68, the module(s) 84 may include, e.g., a duplicating and encrypting module operable to duplicate and encrypt traffic using an encryption key to provide a plurality of encrypted packets, wherein the encryption key is unknown to the LIMB 62 and each encrypted packet is a concatenation of:
  an encrypted user ID, which is a user ID encrypted using the encryption key; and
  an encrypted data block, which is a block of data associated with the user ID where the block of data is encrypted using the encryption key; and
a transmitting module operable to transmit the plurality of encrypted packets to a monitoring node.

As another example, if the network node 76 deploys the LIMB 62, the module(s) 84 may include, e.g., a first receiving module operable to receive a list of one or more obfuscated target IDs from a monitoring node, each obfuscated target ID of the one or more obfuscated target IDs being a user ID of a target user for LI that is encrypted using a first encryption key that is unknown to the network node;
a second receiving module operable to receive an encrypted packet from an element that operates to intercept traffic on another network node in the cellular communications network, where the encrypted packet is a concatenation of:
  an encrypted user ID, which is a user ID encrypted using the first encryption key; and
  an encrypted data block, which is a block of data associated with the user ID where the block of data is encrypted using the first encryption key;
a determining module operable to determine whether the encrypted user ID of the encrypted packet matches one of the one or more obfuscated target IDs; and
a further encrypting module and a transmitting module operable to, if the encrypted user ID of the encrypted packet matches one of the one or more obfuscated target IDs,
  further encrypt the encrypted packet using a second encryption key negotiated between the network node and the monitoring node to thereby provide a further encrypted packet; and
  transmit the further encrypted packet to the monitoring node.

Again, while the discussion above focuses on LI, the systems and methods disclosed herein are not limited thereto. Rather, the systems and methods disclosed herein may be utilized to provide data collection by monitoring traffic in a wireless communication system (e.g., the by monitoring traffic in the cellular communications network 48). In this regard, the LEA node 74 can be viewed as one example of a potentially third-party monitoring entity, the LIMB 62 can be viewed as one example of a middle box, and the ICE's 64, 66, and 68 can be viewed as one example of control elements. Thus, a monitoring function implemented on a monitoring node(s), the middle box, and the control elements operate as described above to provide secure monitoring of traffic in the wireless communication system for one or more target UEs 52.

The following acronyms are used throughout this disclosure.

3GPP Third Generation Partnership Project
5G Fifth Generation
ADMF Administration Function
AES Advanced Encryption Standard
AS Application Server
ASIC Application Specific Integrated Circuit
CC Communication of Content
CP Control Plane
CPU Central Processing Unit
DF Distribution Function
DSP Digital Signal Processor
DTLS Data Transport Layer Security
EEA Evolved Packet System Encryption Algorithm
eNB Enhanced or Evolved Node B
EPC Evolved Packet Core
EPS Evolved Packet System
FPGA Field Programmable Gate Array
gNB New Radio Base Station
HSS Home Subscriber Service
ICE Intercepting Control Element
ID Identifier
IE Information Element
IETF Internet Engineering Task Force
IMEI International Mobile station Equipment Identities
IMSI International Mobile Subscriber Identity
IP Internet Protocol
IPsec Internet Protocol Security
IPv6 Internet Protocol Version 6
IRI Intercept Related Information
ISP Internet Service Provider
LEA Law Enforcement Agency
LEMF Law Enforcement Monitoring Function
LI Lawful Interception
LIMB Lawful Interception Middle-Box LTE Long Term Evolution
MME Mobility Management Entity
MTC Machine Type Communication
NR New Radio
PDCP Packet Data Convergence Protocol
PDN Packet Data Network
PDU Protocol Data Unit
P-GW Packet Data Network Gateway
RAN Radio Access Network
RBS Radio Base Station
SCEF Service Capability Exposure Function
S-GW Serving Gateway
SN Sequence Number
TCP Transmission Control Protocol
TS Technical Specification
UE User Equipment
UP User Plane Those skilled in the art will recognize improvements and modifications to the embodiments of the present disclosure. All such improvements and modifications are considered within the scope of the concepts disclosed herein and the claims that follow.

What is claimed is:

1. A method of operation of a network node in a cellular communications network to provide monitoring of cellular network traffic, comprising:
   receiving a list of one or more obfuscated target identifiers from a monitoring node, each obfuscated target identifier of the one or more obfuscated target identifiers being a user identifier of a target user that is encrypted using a first encryption key that is unknown to the network node;
   receiving an encrypted packet from an element that operates to intercept traffic on another network node in the cellular communications network, where the encrypted packet is a concatenation of:
      a first encrypted user identifier, which is a user identifier encrypted using the first encryption key; and
      an encrypted data block, which is a block of data associated with the user identifier where the block of data is encrypted using the first encryption key;
   determining whether the first encrypted user identifier of the encrypted packet matches one of the one or more obfuscated target identifiers; and
   if the first encrypted user identifier of the encrypted packet matches one of the one or more obfuscated target identifiers:
      further encrypting the encrypted packet using a second encryption key negotiated between the network node and the monitoring node to thereby provide a further encrypted packet; and
      transmitting the further encrypted packet to the monitoring node.

2. The method of claim 1 wherein the block of data is an intercept related information or communication of content type of data.

3. The method of claim 1 wherein the block of data comprises data related to an attach procedure performed for a wireless device having the associated user identifier, data related to a connection procedure performed for the wireless device having the associated user identifier, data related to a tracking area update performed for the wireless device having the associated user identifier, an Internet Protocol, IP, header for an IP packet to or from the wireless device having the associated user identifier, and/or an IP payload for the IP packet to or from the wireless device having the associated user identifier.

4. The method of claim 1 further comprising:
   receiving, from the element, a second encrypted packet and associated cryptographic information, where the second encrypted packet is a concatenation of:
      a second encrypted user identifier, which is a second user identifier encrypted using an updated version of the first encryption key; and
      a second encrypted data block, which is a block of data associated with the second user identifier where the block of data is encrypted using the updated version of the first encryption key;
   updating the one or more obfuscated target identifiers based on the associated cryptographic information to provide one or more updated obfuscated target identifiers;
   determining whether the second encrypted user identifier of the second encrypted packet matches one of the one or more updated obfuscated target identifiers; and
   if the second encrypted user identifier of the second encrypted packet matches one of the one or more updated obfuscated target identifiers:
      further encrypting the second encrypted packet using the second encryption key negotiated between the network node and the monitoring node to thereby provide a second further encrypted packet; and
      transmitting the second further encrypted packet to the monitoring node.

5. The method of claim 4 wherein transmitting the second further encrypted packet to the monitoring node comprises transmitting the second further encrypted packet and at least a portion of the cryptographic information to the monitoring node.

6. The method of claim 5 wherein the at least a portion of the cryptographic information comprises an indication that enables the monitoring node to update the one or more obfuscated target identifiers.

7. The method of claim 4 wherein the cryptographic information comprises information that enables updating the one or more obfuscated target identifiers without secret keys.

8. The method of claim 4 wherein the cryptographic information comprises a delta value that represents a difference between a first pseudorandom keystream that represents the first encryption key and a second pseudorandom keystream that represents the updated version of the first encryption key.

9. The method of claim 8 wherein the cryptographic information further comprises a sequence number used to generate the updated version of the first encryption key.

10. The method of claim 8 wherein the first encryption key is a pseudorandom keystream generated via Advanced Encryption Standard, AES, in counter mode.

11. A network node in a cellular communications network to provide monitoring of cellular network traffic, comprising:
   at least one processor; and
   memory comprising instructions executable by the at least one processor whereby the network node is operable to:
      receive a list of one or more obfuscated target identifiers from a monitoring node, each obfuscated target identifier of the one or more obfuscated target identifiers being a user identifier of a target user that is encrypted using a first encryption key that is unknown to the network node;
      receive an encrypted packet from an element that operates to intercept traffic on another network node in the cellular communications network, where the encrypted packet is a concatenation of:

a first encrypted user identifier, which is a user identifier encrypted using the first encryption key; and an encrypted data block, which is a block of data associated with the user identifier where the block of data is encrypted using the first encryption key;

determine whether the first encrypted user identifier of the encrypted packet matches one of the one or more obfuscated target identifiers; and if the first encrypted user identifier of the encrypted packet matches one of the one or more obfuscated target identifiers:

further encrypt the encrypted packet using a second encryption key negotiated between the network node and the monitoring node to thereby provide a further encrypted packet; and transmit the further encrypted packet to the monitoring node.

\* \* \* \* \*